Figure 1:
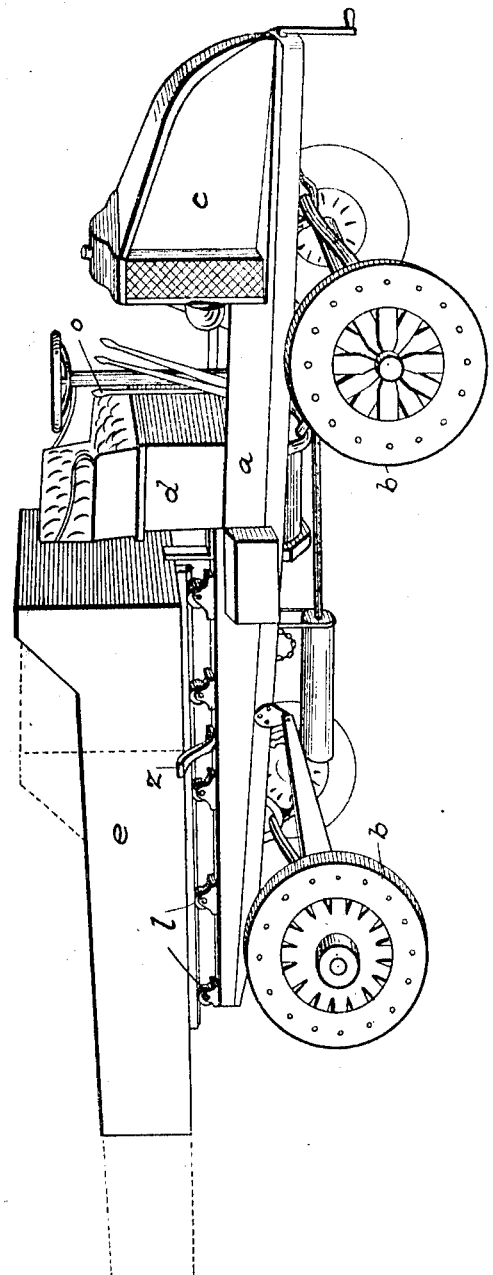

F. A. COOK.
COUNTERBALANCED UNLOADING DEVICE FOR TRUCKS.
APPLICATION FILED NOV. 11, 1911.

1,061,223. Patented May 6, 1913.
2 SHEETS—SHEET 1.

WITNESSES:
Cecil Long
W. Lewis Coop.

INVENTOR
Fred A. Cook
BY [signature]
ATTORNEY

F. A. COOK.
COUNTERBALANCED UNLOADING DEVICE FOR TRUCKS.
APPLICATION FILED NOV. 11, 1911.
1,061,223.
Patented May 6, 1913.
2 SHEETS—SHEET 2.
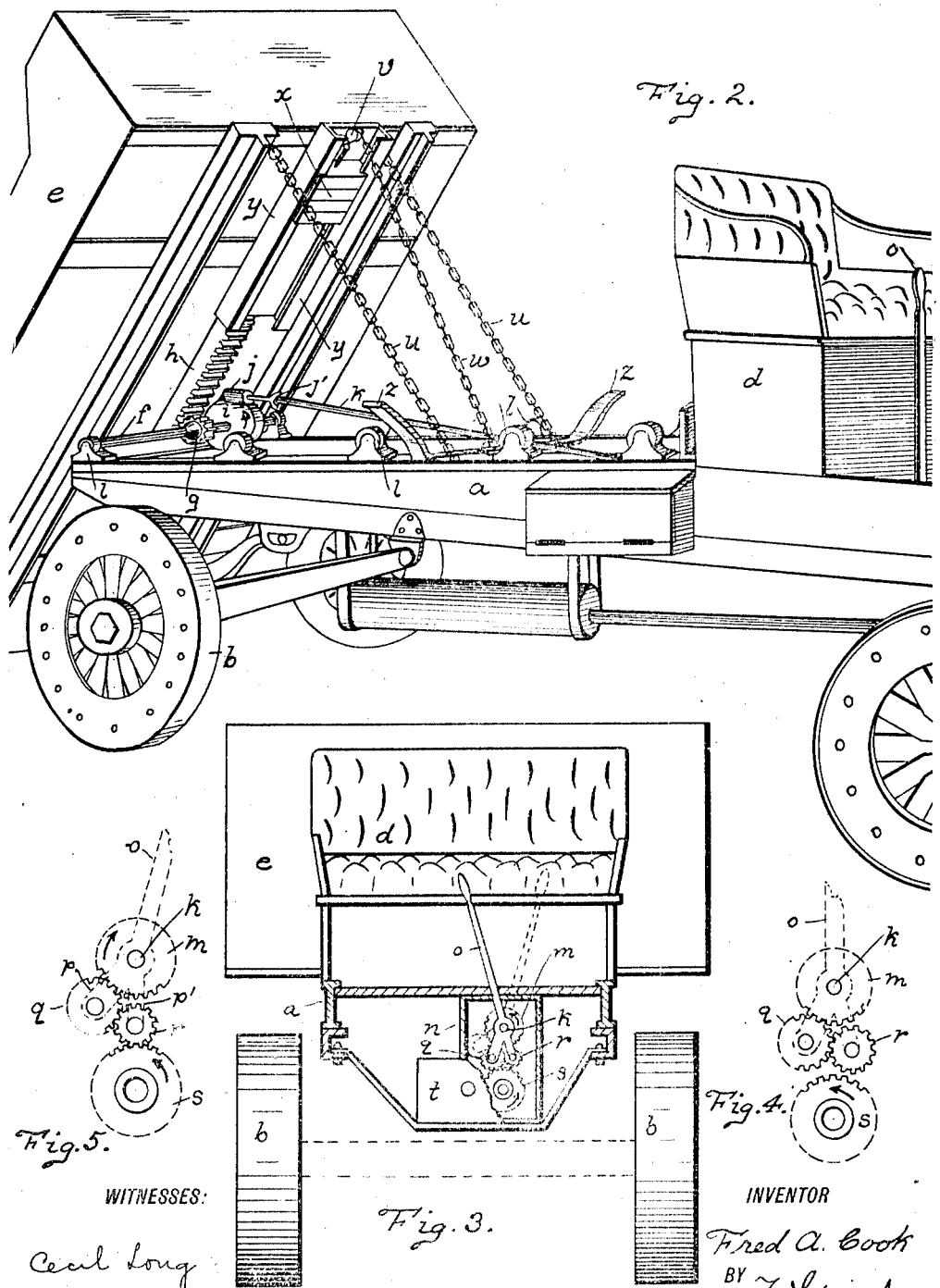

UNITED STATES PATENT OFFICE.

FRED A. COOK, OF PORTLAND, OREGON.

COUNTERBALANCED UNLOADING DEVICE FOR TRUCKS.

1,061,223.

Specification of Letters Patent.

Patented May 6, 1913.

Application filed November 11, 1911. Serial No. 659,870.

*To all whom it may concern:*

Be it known that I, FRED A. COOK, a citizen of the United States, and a resident of the city of Portland, county of Multnomah, State of Oregon, have invented a new and useful Improvement in Counterbalanced Unloading Devices for Trucks, of which the following is a specification.

This invention relates to trucks or dump cars of the "auto" or motor type, and the object of my invention is to provide efficient and durable means by which the power of the driving engine is applied to move the body of the truck so as to discharge the load, and also to return the empty body to its normal position.

The further object of my invention is to include in said devices means for balancing the body of the truck, while lifted or tilted on the running gear into position to discharge its load, and while being returned to its normal position, so as to eliminate all avoidable shocking and jarring of the vehicle, and minimize those not to be avoided, and in so doing prolong the life of the vehicle and the devices provided for handling the load.

My invention also includes the specific features hereinafter fully set forth.

Referring now to the accompanying drawings, constituting a part of this specification: Figure 1 is a side elevation, in perspective, of the motor truck provided with a movable and tiltable body, and with my invention for handling such body; this view also shows, in dotted outline, the position of the vehicle-body when moved rearward prior to tilting the same; Fig. 2 is a larger-scale side elevation, in perspective, illustrating more clearly the arrangement and operation of the devices provided by me for handling the vehicle body, also showing the counter-weight, and operating means thereof, provided by me for maintaining the vehicle body more or less in balance while being tilted and thus preventing severe shocking and jarring of the vehicle and the load-handling devices; Fig. 3 is a sectional front elevation illustrating the clutch mechanism for applying the power of the driving engine for moving the vehicle body into dumping position and returning it to its normal position; in this view the clutch is shown as adjusted for moving the body rearward in order to dump the load; Fig. 4 is a diagrammatic view illustrating the clutch mechanism placed in its neutral position; and Fig. 5 is a diagrammatic view of the clutch mechanism placed in position to cause the power applying and vehicle-body handling devices to work to return the vehicle-body to its normal position.

The truck-frame, $a$, wheels, $b$, motor-housing, $c$, and seat, $d$, in their entirety represent a common type of motor truck, made with a box-like body, $e$, slidably mounted on rollers $l$, $l$, journaled in said frame, $a$, of the running gear. A shaft $f$, which may be the axis of the two rearmost rollers, has mounted on it a pinion $g$, in mesh with a rack $h$, rigidly fastened to the bottom of the body $e$. On the shaft $f$ is mounted a worm wheel (not shown) contained in a case, $i$, in mesh with the worm (not shown) contained in a case $j$, said worm being connected by universal coupling $j'$ with a shaft $k$, on the right end of which is rigidly mounted a pinion $m$ of the clutch mechanism $n$, seen only in Figs. 3 to 5.

A lever, $o$, rotatably mounted on the shaft $k$ of the pinion $m$, is formed with a forked lower extremity, on one member, $p$, of which is journaled a pinion $q$, in mesh with the pinion $r$, journaled on the other lever member $p'$. In Fig. 3 the pinion $q$ is shown as also in mesh with the pinion $s$ of the transmission box $t$, the latter being any convenient pinion included in the devices of said transmission box $t$. In the position illustrated in Fig. 3, the lever, $o$, is shown as moved to the left, and the pinion $s$, which is understood as driven in the direction indicated by the arrow, applies the power of the engine so as to drive the shaft $f$ for causing the moving of the truck-body, $e$, rearward until it becomes over-balanced and dumps its load. To the forward end of the body $e$ are attached restraining chains, $u$, $u$, the lower ends of which are fastened to the truck-frame. There is also mounted on said forward end a sheave-wheel $v$, over which passes a chain $w$, rigidly attached at its lower end to the truck-frame $a$, and the upper end of such chain $w$ is attached to a counter-weight $x$, operating in guides $y$, $y$, rigidly attached to the bottom of the body $e$. When the truck-body is in its load-receiving position, the counter-weight is near the rear or left end of the guides $y$, but upon tilting the body $e$, as in dumping, the chain $w$ is relatively shortened and pulls the counter-weight $x$ forward, thereby balancing the vehicle-body, and its load more or less, and restraining the too rapid tilting of the vehicle-body which would cause a severe jar to the vehicle, when the motion of the body e is suddenly brought to a stop. After the body assumes the position shown in Fig. 2, the lever o of the clutch mechanism n is moved into its neutral or perpendicular position, as illustrated diagrammatically in Fig. 4, so that neither of the pinions q or r is in mesh with the pinion s, and all motion transmission from the engine is interrupted. The movement of the lever o toward the right will throw the pinion r in mesh with the pinion s, as illustrated in Fig. 5, whereby the power of the engine will be applied to move the truck body e back to its initial or normal position; and when in the course of such movement the body e is again over-balanced, causing the forward end to drop onto the truck-frame a, the chain w will be relatively lengthened permitting the counter-weight to slide rearward on the guides y and thus to a degree automatically again placing the vehicle-body more or less in balance on its pivoted center, which, as evident, is the pinion g, and minimizing the impact of the vehicle-body with the truck-frame a, while becoming reseated in its normal position on the latter. After the vehicle body has been returned to its normal position, the lever o is again brought to perpendicular or neutral position, as illustrated in Fig. 4. The projections, z, z, restrain the body e against abnormal lateral motion.

I claim:

1. In a truck, the combination with the frame of the running gear and a truck-body supported longitudinally movable on such truck-frame, the supporting devices also adapted to permit the tilting of the truck-body when moved rearward to the degree causing it to over-balance; of means for moving the truck-body rearward and thus causing it to tilt on its fulcrum; a counter-weight slidably supported at the forward end of the truck-body; and means adapted to cause said counter-weight to automatically move from and toward the fulcrum of the truck-body while the latter is tilting into discharging position and also while returning to its normal position.

2. In a truck, the combination with the frame of the running gear and a truck-body supported longitudinally movable on such truck-frame, the supporting devices also adapted to permit the tilting of the truck-body when moved rearward to the degree causing it to over-balance; a longitudinal guide affixed under the truck-body, a counter-weight sliding in such guide, a cable fastened at one end to the counter-weight and at its opposite end to the truck-body, a sheave secured to the forward end of the truck-body over which sheave said cable passes; and the devices being adapted to cause the counter-weight to move from and toward the fulcrum of the truck-body while the latter is tilting into discharging position and also while returning to its normal position.

3. In a truck, the combination with the frame of the running gear and a truck-body supported longitudinally movable on such truck-frame, the supporting devices also adapted to permit the tilting of the truck-body when moved rearward to the degree causing it to over-balance; a longitudinal guide affixed under the truck-body, a counter-weight sliding in such guide, a cable fastened at one end to the counter-weight and at its opposite end to the truck-body, a sheave secured to the forward end of the truck-body over which sheave said cable passes; a cable connecting the forward end of the truck-body with the truck-frame; and the devices being adapted to cause the counter-weight to move from and toward the fulcrum of the truck-body while the latter is tilting into discharging position and also while returning to its normal position.

4. In a truck, the combination with the frame of the running gear and a truck-body supported longitudinally movable on such truck-frame; a rack extending longitudinally under the truck-body, a pinion engaging said rack, means for rotating the pinion; a counter-weight slidably supported at the forward end of the truck-body; and means adapted to cause said counter-weight to automatically move from and toward the fulcrum of the truck-body while the latter is tilting into discharging position and also while returning to its normal position.

5. In a truck, the combination with the frame of the running gear and a truck-body supported longitudinally movable on such truck-frame; a rack extending longitudinally under the truck-body, a pinion engaging said rack, means for rotating the pinion; a longitudinal guide affixed under the truck-body, a counter-weight sliding in such guide, a cable fastened at one end to the counter-weight and at its opposite end to the truck-body, a sheave secured to the forward end of the truck-body over which sheave said cable passes; and the devices being adapted to cause the counter-weight to move from and toward the fulcrum of the truck-body while the latter is tilting into discharging position and also while returning to its normal position.

6. In a truck, the combination with the frame of the running gear and a truck-body supported longitudinally movable on such truck-frame; a rack extending longitudinally under the truck-body, a pinion engaging said rack, means for rotating the pinion; a longitudinal guide affixed under the truck-body, a counter-weight sliding in such guide, a cable fastened at one end to the counter-weight and at its opposite end to the truck-body, a sheave secured to the forward end of the truck-body over which sheave said cable passes; a cable connecting the forward end of the truck-body with the truck-frame; and the devices being adapted to cause the counter-weight to move from and toward the fulcrum of the truck-body while the latter is tilting into discharging position and also while returning to its normal position.

FRED A. COOK.

Witnesses:
 CECIL LONG,
 W. LEWIS COOP.

Copies of this patent may be obtained for five cents each, by addressing the "Commissioner of Patents, Washington, D. C."